United States Patent [19]
Mieno et al.

[11] Patent Number: 4,790,281
[45] Date of Patent: Dec. 13, 1988

[54] METHOD OF AND APPARATUS FOR CONTROLLING IGNITION TIMING IN INTERNAL COMBUSTION ENGINE

[75] Inventors: Toshiyuki Mieno; Toyohei Nakajima; Akira Nagao; Yukihiko Suzaki; Akira Tanaka, all of Wako, Japan

[73] Assignee: Honda Giken Kogyo Kabushiki Kaisha, Tokyo, Japan

[21] Appl. No.: 74,733

[22] Filed: Jul. 17, 1987

[30] Foreign Application Priority Data

Jul. 22, 1986 [JP] Japan ................. 61-170930
Jul. 22, 1986 [JP] Japan ................. 61-170931

[51] Int. Cl.$^4$ ............................. F02P 5/15
[52] U.S. Cl. ..................... 123/425; 123/422
[58] Field of Search ................. 123/425, 422

[56] References Cited

U.S. PATENT DOCUMENTS 4,351,281  9/1982  Geiger et al. ............ 123/425
4,426,975  1/1984  Suzuki et al. ........... 123/425
4,541,382  9/1985  Hosoe et al. ............ 123/425
4,549,514 10/1985  Abe et al. .............. 123/425

FOREIGN PATENT DOCUMENTS 59-48308  11/1984  Japan .

Primary Examiner—Andrew M. Dolinar
Attorney, Agent, or Firm—Armstrong, Nikaido, Marmelstein & Kubovcik

[57] ABSTRACT

A method of and an apparatus for controlling ignition timing in an internal combustion engine, which determines the ignition timing on the basis of the engine speed and load state, discriminates whether or not knocking has occurred on the basis of the output of a knocking detection circuit, retards the so-determined ignition timing by a predetermined amount when knocking occurs, and advances the ignition timing by a predetermined amount after knocking has been avoided. The maximum amount of retardation and advancement carried out upon occurrence of knocking is varied depending on one or more engine operating conditions, enabling the ignition timing to be controlled to near MBT and the engine output to be the maximum possible. The said engine operating condition or conditions include an engine speed in the case of compensation in the direction of ignition retardation and include an engine speed and a load state in the case of compensation in the direction of ignition advance.

4 Claims, 4 Drawing Sheets

| Control region | Maximum amount of retardation $d\theta_R$ (°) | Ref. no. of knockings Ikr (in no. of firings) | Judgment period In (in no. of firings) | Wait period Iw (in no. of firings) | Maximum amount of advance $d\theta_A$ (°) | | |
|---|---|---|---|---|---|---|---|
| | | | | | $Pb_1 \leq Pb$ (mmHg) | $Pb_2 \leq Pb < Pb_1$ | $Pb_3 \leq Pb < Pb_2$ |
| Z1 | $d\theta_{R1}$ | Ikr1 | In1 | Iw1 | $d\theta_{A1}$ | $d\theta_{A5}$ | $d\theta_{A9}$ |
| Z2 | $d\theta_{R2}$ | Ikr2 | In2 | Iw2 | $d\theta_{A2}$ | $d\theta_{A6}$ | $d\theta_{A10}$ |
| Z3 | $d\theta_{R3}$ | Ikr3 | In3 | Iw3 | $d\theta_{A3}$ | $d\theta_{A7}$ | $d\theta_{A11}$ |
| Z4 | $d\theta_{R4}$ | Ikr4 | In4 | Iw4 | $d\theta_{A4}$ | $d\theta_{A8}$ | $d\theta_{A12}$ |

FIG. 3

| Control region | Maximum amount of retardation $d\theta R$ (°) | Ref. no. of knockings $Ikr$ (in no. of firings) | Judgment period $In$ (in no. of firings) | Wait period $Iw$ (in no. of firings) | Maximum amount of advance $d\theta A$ (°) | | |
|---|---|---|---|---|---|---|---|
| | | | | | $Pb1 \leq Pb$ (mmHg) | $Pb2 \leq Pb < Pb1$ | $Pb3 \leq Pb < Pb2$ |
| Z1 | $d\theta R1$ | $Ikr1$ | $In1$ | $Iw1$ | $d\theta A1$ | $d\theta A5$ | $d\theta A9$ |
| Z2 | $d\theta R2$ | $Ikr2$ | $In2$ | $Iw2$ | $d\theta A2$ | $d\theta A6$ | $d\theta A10$ |
| Z3 | $d\theta R3$ | $Ikr3$ | $In3$ | $Iw3$ | $d\theta A3$ | $d\theta A7$ | $d\theta A11$ |
| Z4 | $d\theta R4$ | $Ikr4$ | $In4$ | $Iw4$ | $d\theta A4$ | $d\theta A8$ | $d\theta A12$ |

METHOD OF AND APPARATUS FOR CONTROLLING IGNITION TIMING IN INTERNAL COMBUSTION ENGINE

BACKGROUND OF THE INVENTION

1. Field of the Invention

This invention relates to a method of and an apparatus for controlling ignition timing in an internal combustion engine, more specifically to a method of and an apparatus for controlling ignition timing in an internal combustion engine wherein the maximum value of ignition angle retardation at occurrence of knocking and the maximum angle of ignition advance after knocking has been avoided are varied depending on the operating condition of the engine.

2. Description of the Prior Art

In controlling ignition timing in an internal combustion engine, it is a common conventional practice to detect when knocking begins and then compensate the basic ignition timing to cause the knocking to stop. One example of such a practice is disclosed in Japanese Patent Publication No. 59(1984)-48308. In such a practice, the maximum amount of compensation is not changed over the whole range of engine operating conditions.

In an internal combustion engine, the knocking limit (the maximum angle of ignition advance at which knocking can be suppressed) intrinsically varies with the operating condition and operating environment of the engine. Naturally, the relationship between the knocking limit and the MBT (Minimum advance for Best Torque) also varies depending on the engine operating condition and environment. In the prior art, however, since the maximum amount of compensation is fixed over the full range of engine operating conditions, sometimes the amount of retarding compensation at the time knocking occurs is greater than necessary and also sometimes the amount of counter-compensation carried out in the direction of advance after knocking has been avoided results in an ignition timing that is still unnecessarily retarded than MTB. As a result, it has not been possible to obtain the full potential power of the engine.

SUMMARY OF THE INVENTION

In consideration of the aforesaid shortcomings of the prior art, it is an object of the invention to provide a method of and an apparatus for controlling the ignition timing in an internal combustion engine wherein the maximum value of ignition angle retardation at occurrence of knocking and the maximum angle of ignition advance after knocking has been avoided are varied in response to the operating condition of the engine, whereby it becomes possible to avoid knocking over the full range of engine operating conditions while also ensuring the maximum possible output from the engine.

Another object of the invention is to provide a method of and an apparatus for controlling an internal combustion engine wherein the ignition advance is determined depending on the frequency of knocking occurrence whereby recurrence of knocking is prevented while the engine operation is optimized.

For realizing these objects, the present invention provides in its first aspect, a method of controlling ignition timing in an internal combustion engine which comprises, determining a basic ignition timing on the basis of an operating condition of the engine and compensating the basic ignition timing for retard when knocking occurs while compensating it for advance when the knocking has been avoided. In the method, the maximum amount of the compensation varies depending on the engine operating condition. The present invention further provides in its second aspect, an apparatus for controlling ignition timing in an internal combustion engine which comprises, a device for detecting engine operating condition disposed at an appropriate part of the engine, a device for detecting the state of combustion in a combustion chamber disposed in the vicinity of the combustion chamber, a device for determining ignition timing on the basis of the output of the engine operating condition detection device while discriminating whether or not knocking occurs on the basis of the output of the combustion state detection device and compensating the so-determined ignition timing by a predetermined amount when knocking occurs and an ignition device which ignites an air/fuel mixture in the combustion chamber upon receiving the output of the ignition timing determining device. In the apparatus, the maximum amount by which the ignition timing is compensated upon the occurrence of knocking varies depending on the engine operating condition.

The above and other features of the present invention will become apparent from the following description made with reference to the drawings.

BRIEF DESCRIPTION OF THE DRAWINGS

FIG. 3 is a table for explaining how the maximum value of the amount of ignition angle compensation is varied depending on the engine operating condition;

DESCRIPTION OF THE PREFERRED EMBODIMENTS

Figure 1:
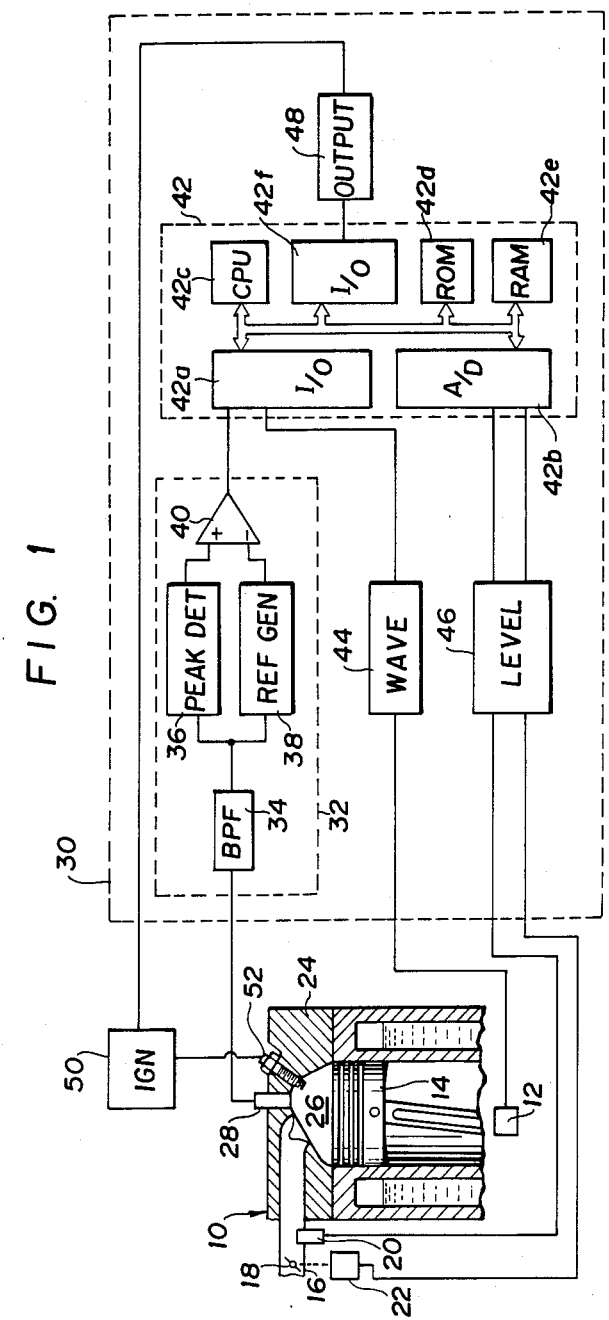
FIG. 1 is a block diagram showing the overall structure of an apparatus for controlling ignition timing in an internal combustion engine according to the invention.

Referring to the block diagram of one embodiment of the invention shown in FIG. 1, a crankshaft angle sensor 12, which may be constituted using an electromagnetic pickup or the like, is disposed in the vicinity of a rotating member of an internal combustion engine 10 for detecting the crankshaft angle of the engine 10. A throttle valve 18 is provided in an air intake passage 16 and a pressure sensor 20 for detecting the absolute pressure of an air flowing at this point is provided downstream of the throttle valve 18. The detected pressure of the intake air is used for determining the engine load condition. A throttle sensor 22 constituted as a potentiometer or the like is provided in the vicinity of the throttle valve 18 for detecting the degree of opening thereof.

The internal combustion engine 10 is further provided at an appropriate part of a cylinder head 24 with a knocking sensor 28 comprising a piezoelectric element for sensing vibration of the head so as to detect the state of combustion of an air/fuel mixture in a combustion chamber 26. The output of the knocking sensor 28 is sent to a control unit 30 where it is input to a knocking detection circuit 32. In the knocking detection circuit 32, the signal from the knocking sensor 28 is initially input to a band pass filter 34 for extraction of only the knocking frequency component. The output of the band pass filter 34 is, on the one hand, sent to a peak detection circuit 36 where the peak value of the knocking signal is detected. It is also forwarded to a comparison reference value generator 38 where the mean value of the signal from the knocking sensor 28 during non-knocking operation is detected. The outputs of the peak detection circuit 36 and the comparison reference value generator 38 are sent to a comparator 40 where the two outputs are compared and when the peak value exceeds the mean value, it is determined that knocking has occurred. The stage following the knocking detection circuit 32 is a microcomputer 42. The main components of the microcomputer 42 are an input panel 42a, and A/D (analog/digital) converter 42b, a CPU (central processing unit) 42c, a ROM (read-only memory) 42d, a RAM (random access memory) 42e and an output panel 42f. The output of the knocking detection circuit 32 is input to the microcomputer 42 and stored in the RAM 42e.

The output of the crankshaft angle sensor 12 is also input to the control unit 30, wherein it is first shaped by a wave-shaping circuit 44 and then input to the microcomputer 42 via the input panel 42a for storage in the RAM 42e. The output of the pressure sensor 20 and the throttle sensor 22 are also input to the control unit 30 and are level-converted in a level converter 46 and then sent to the microcomputer 42, where they are first converted to digital form by the A/D converter 42b and then stored in the RAM 42e. The CPU 42c determines the ignition timing by using the outputs of the crankshaft angle sensor 12 and the pressure sensor 22 to retrieve mapped values stored in the ROM 42d. It also discriminates from the output of the knocking detection circuit 32 whether or not knocking has occurred and when knocking has occurred, it first compensates (retards) the ignition timing by a predetermined amount and then after knocking has been avoided, further compensates the ignition timing by a predetermined amount in the direction of ignition advance. As will be explained in more detail later, the maximum amounts of ignition timing compensation carried out when knocking occurs varies depending on one or more engine operating conditions. Namely, the CPU 42c uses the outputs of the crankshaft angle sensor 12 and the pressure sensor 20 for retrieving a maximum compensation value from values stored in the form of a table in the ROM 42d and uses the retrieved value for carrying out the compensation for eliminating knocking. The CPU 42c also calculates from the output of the throttle sensor 22 the rate of change in the opening of the throttle valve 18 per unit time and detects by comparing the calculated value with a predetermined value whether or not the engine is in a transient operating state, particularly whether it is in a rapidly accelerating state, and if it is, adjusts the ignition timing for advance in a manner to be explained later. Alternatively, the throttle sensor 22 may be omitted and the detection of transient operating state can be detected from the rate of change per unit time in the outputs of the crankshaft angle sensor 12 and/or the pressure sensor 20. The determined ignition timing is sent to an output circuit 48 constituting the next stage following the microcomputer 42, and from the output circuit 48 is sent to an ignition device 50, which may be an igniter or the like. The ignition device 50 actuates an ignition plug 52 so as to ignite the air/fuel mixture in the combustion chamber 26.

Figure 2:
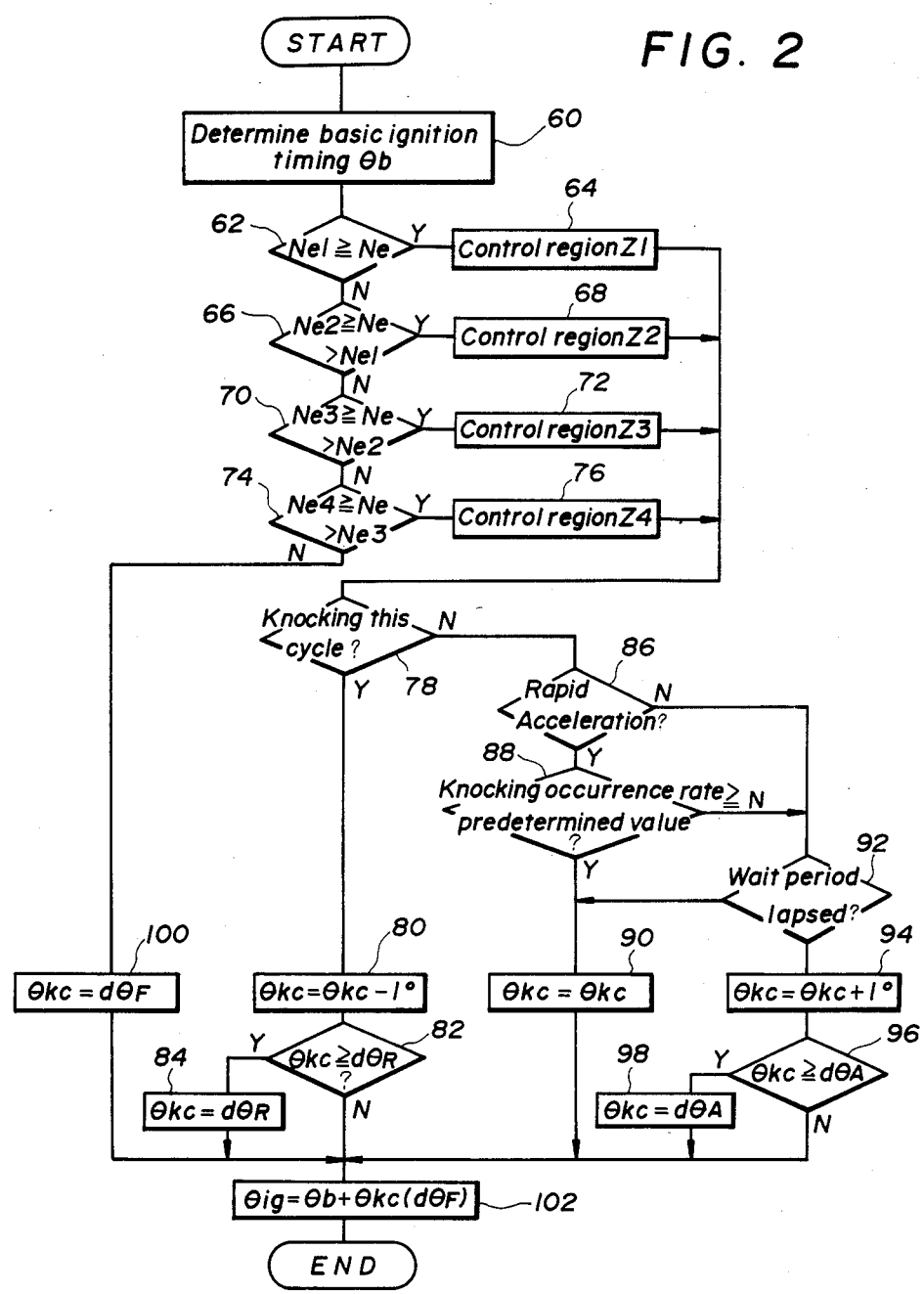
FIG. 2 is a flowchart showing the operation of the apparatus of FIG. 1 as well as an embodiment of a method of controlling ignition timing in an internal combustion engine.

The operation of the apparatus as well as an embodiment of a method of ignition control according to the invention will now be explained with reference to the flowchart of FIG. 2. The program is started once per predetermined crankshaft angle.

First, in step 60, the basic ignition timing $\theta b$ is determined. Namely, the microcomputer 42 retrieves the ignition timing from mapped values stored in the ROM 42d using the outputs from the crankshaft angle sensor 12 and the pressure sensor 20 as address data as mentioned before. Moreover, while not shown, it is also possible to provide the engine with a coolant temperature sensor or the like and use the output thereof for appropriately compensating the retrieved basic ignition timing.

In the steps 62 to 76, the current engine speed Ne calculated from a value detected by the crankshaft angle sensor 12 is compared with each of four prescribed engine speeds Ne1, Ne2, Ne3 and Ne4 and, based on the results of this comparison, one of four control regions Z1, Z2, Z3 and Z4 is selected. One characteristic feature of this invention is that the maximum value of the ignition timing compensation carried out when knocking occurs is varies depending on the operating condition of the internal combustion engine. This is done by dividing the engine operating condition into four regions, namely the control regions Z1, Z2, Z3 and Z4, and selecting one of these four regions depending on the current engine speed. FIG. 3 shows these control regions in detail. As will be noted from this figure, the maximum amount of retardation compensation $d\theta R$ and the amount of counter-compensation (advance) $d\theta A$ differ among the respective regions. This table shown in FIG. 3 is stored in the ROM 42d of the microcomputer 42. The establishment of four regions in this manner makes the system simple and holds the amount of memory capacity used for storing the mapped ignition timing data to a very small amount. It is thus possible to ensure high output from the engine merely by adding such a simple control data table to the system.

After the pertinent control region among the regions Z1 to Z4 has been determined in the steps 62 to 76, the procedure moves to step 78 where it is determined from the output of the knocking detection circuit 32 whether knocking has occurred during the current cycle. When it is determined that knocking has occurred, the procedure moves to step 80 where the knocking compensation amount $\theta kc$ is retarded by one degree. (In the flowchart, retardation of the ignition angle is shown as subtraction while advancement thereof is shown as addition. The initial value of the knocking compensation amount $\theta kc$ is zero.) Then in step 82, it is determined whether or not the accrued amount of knocking compensation $\theta kc$ carried out once per ignition has reached the maximum value $d\theta R$, and, if it has, the accrued amount of knocking compensatin is limited to this value (step 84). As shown in FIG. 3, the maximum amount of retardation compensation $d\theta R$ is given the different values $d\theta R1$, $d\theta R2$, $d\theta R3$ and $d\theta R4$ depending on the control region, and the value corresponding to the control region determined in the steps 62 to 76 is selected, whereafter it is determined whether the actual amount of retardation compensation has reached the selected value. All of the maximum retardation values are determined experimentally in advance so as to be adequate for avoiding knocking and to limit the reduction in engine output to the minimum possible.

When it is found in the step 78 that knocking has not occurred during the current cycle, the procedure moves to step 86 where it is determined whether or not the engine is in a transient state of operation, particularly in a rapid acceleration state. The reason why the determination is needed here is explained later. This is done by calculating the rate of change in the outputs from the throttle sensor 22 or the crankshaft angle sensor 12 and/or the pressure sensor 20 over a predetermined angular or time interval and then by comparing the calculated value with a predetermined value. When it is found that the engine is in a rapid acceleration state, the procedure moves to step 88 where it is determined whether or not the frequency of knocking occurrence is equal to or greater than a predetermined value. This determination is made by determining whether or not the rate of knocking is equal to or higher than a predetermined value over a period starting several firings earlier. Specifically, it is determined whether $$Ika/In > Ikr/In,$$

where $Ika$ is the number of firings at which knocking actually occurred, $Ikr$ is a reference value for comparison and $In$ is the number of firings (the period) over which the determination is made. These calculation coefficients $Ikr$ and $In$ are obtained from the table shown in FIG. 3. As shown, they differ among the respective regions, similarly as the maximum amount of $d\theta R$ and $d\theta A$. The other coefficient $Ika$ is obtained by counting the number of firings at which knocking actually occurred. Also, these values are shown graphically in FIG. 4. For the purpose of understanding, the values are illustrated consecutively here on the contrary to those shown in FIG. 3 which are divided into the four groups.

Figure 4:
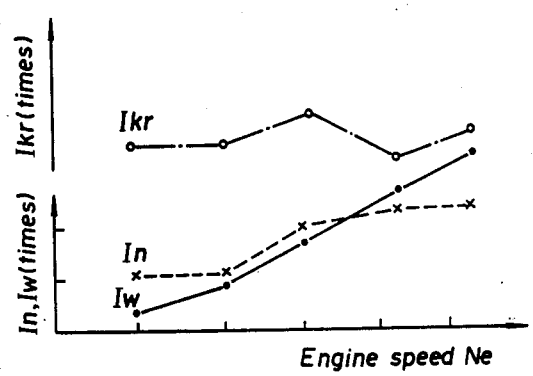
FIG. 4 is a graph for explaining the value used for calculating the frequency of knocking occurrence when determining ignition advancement.
Figure 5:
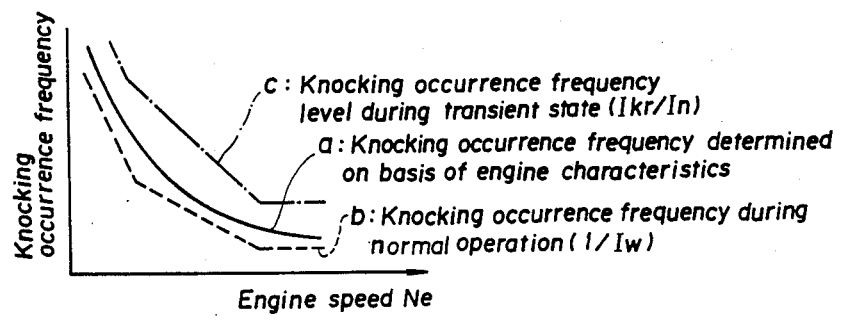
FIG. 5 is a graph for explaining how the frequency of knocking occurrence depends on engine operating condition.

When it is determined in the step 88 that the frequency of knocking occurrence is not less than the predetermined value, compensation of the ignition timing in the advance direction is stopped and the compensation value used in the preceding cycle is maintained unchanged (step 90). On the other hand, when the frequency of knocking occurrence is less than the predetermined value or the engine is not the rapid acceleration state, the procedure moves to step 92 where it is determined whether an ignition advance wait period Iw (defined in terms of a prescribed number of firings) has passed, and if it has not, ignition compensation in the advance direction is stopped and the compensation value used in the preceding cycle is used again (step 90). As shown in FIG. 3, different values Iw1-Iw4 are set for the ignition advance wait period Iw depending on the control region, and the value corresponding to the selected control region is selected for use. The frequency of knocking occurrence and the ignition advance wait period will be explained with reference to FIG. 5. Namely, when the engine is operating at low speed it is preferable to time the ignition to occur in the vicinity of the point at which trace knocking occurs so as to obtain optimum output from the engine. However, since in high speed operation knocking is apt to cause damage to the engine, it is necessary to keep the ignition timing at a more retarded position. Thus, as shown in FIG. 5, during normal engine operation, it is desirable that the ignition timing of the engine be controlled such that the knocking occurrence frequency (Curve b) is lower than the aforesaid trace knocking level indicated by the Curve a, this trace knocking level being determined from the intrinsic characteristics of the engine as a knocking occurrence frequency that is inversely proportional to the engine speed. On the other hand, during rapid acceleration of engine operation, it becomes impossible to obtain the required increase in engine output without increasing the frequency of knocking. But even in this case, for protecting the engine it is necessary to keep the frequency of knocking below a prescribed limit value (Curve c). Therefore, at the time of determining the advancing adjustment of the ignition timing following prevention of knocking, a plurality of reference knocking occurrence frequencies are set and the ignition timing is controlled after discriminating whether the engine is in a normal or a transient state of operation, whereby it becomes possible to obtain a uniform knocking occurrence frequency irrespective of changes in the engine operating condition as well as to operate the engine at optimum output. The values shown for the reference number of firings with knocking $Ikr$ etc. in FIG. 4 are set on the basis of the knocking occurrence frequency of FIG. 5, and $Ikr/In$ is set to correspond to the knocking occurrence frequency during knocking (Curve c of FIG. 5) and $1/Iw$ is set to correspond to the knocking occurrence frequency during normal operation (Curve b in FIG. 5). More specifically, the ignition advance wait period Iw can, in the sense that a single occurrence of knocking is permissible within this period, be thought of as the reciprocal of the knocking occurrence frequency. Here it should be noted that, however, it is alternatively possible to eliminate the steps 86 and 88 and to move directly to the step 92 when the determination is negative in step 78.

Thus, when it is found in step 92 that the ignition advance wait period has passed, the knocking compensation amount $\theta kc$ is advanced by one degree, whereafter ignition advance is continued up to the limit permitted by the maximum counter-compensation $d\theta A$ (steps 94, 96 and 98). It should be noted that the maximum counter-compensation $d\theta A$ differs not only with the engine speed (Ne1-Ne4) but also with the pressure Pb of the intake air. Namely, the current pressure value Pb as detected by the pressure sensor 20 is compared with predetermined pressure values Pb1, Pb2, Pb3 and Pb4 and one of maximum values $d\theta A1-d\theta A12$ is selected based on the result of the comparison. All of the maximum advance values $d\theta A$ are determined experimentally in advance as knocking limit values which enable the engine to operate as near to MBT as possible under all types of engine operation conditions as determined with reference to engine speed and the engine load state. Therefore, after knocking has been avoided, the engine can be operated at optimum torque by advancing the ignition timing to the aforesaid maximum value.

Again returning to FIG. 2, when the current engine speed Ne is found to be out of the reference speeds, the knocking compensation amount $\theta kc$ is set at a fixed value $d\theta F$ (step 100) and in the final step 102 the knocking compensation amount $\theta kc$ or the fixed value $d\theta F$ is added to the basic ignition timing $\theta b$ to obtain the ignition timing $\theta ig$, which is then sent to the ignition device 50.

According to the present invention, since the maximum amount by which the ignition timing is compensated upon the occurrence of knocking differs depending on the engine operating condition, it becomes possible to reliably avoid knocking while operating the engine at an ignition timing that ensures high torque over the full range of engine operating conditions.

The present invention has thus been shown and described with reference to specific embodiments. However, it should be noted that the present invention is in no way limited to the details of the described arrangements but changes and modifications may be made without departing from the scope of the appended claims.

What is claimed is:

1. An apparatus for controlling ignition timing in an internal combustion engine, comprising:

first means for detecting an angular position of an engine crankshaft to generate a signal indicative of engine speed;

second means for detecting a state of engine load to generate a signal in response thereto;

third means for detecting a knock condition of the engine to generate a signal in response thereto;

control means for receiving output signals of the first, second and third means to determine a basic ignition timing of the engine based upon the detected engine speed and engine load, and to retard the basic ignition timing by a predetermined retarding amount when the knock condition is detected, said control means further determining, based upon the detected engine speed, a maximum retarding amount for retarding the ignition timing, a wait period and a maximum advancing amount for advancing the ignition timing, said control means advancing the retarded ignition timing by a predetermined advancing amount when the wait period has lapsed if the knock condition is not detected, said control means further determining whether an accrued amount for retarding or an accrued amount for advancing reaches the respective maximum retarding or advancing amount and when it does, limiting the respective accrued amount to said respective maximum amount, said control means generating a signal in response to the determined ignition timing; and ignition means for receiving the output signal of the control means to ignite an air/fuel mixture in a combustion chamber of the engine.

2. An apparatus according to claim 1, further comprising fourth means for detecting an acceleration state of the engine to generate a signal in response thereto and wherein, said control means further determines a reference knocking occurrence rate based upon the detected engine speed and calculates an actual knocking occurrence rate from the output signal of the third means, said control means receiving output signals of the fourth means, comparing the calculated actual rate with the reference rate when the acceleration state is detected and stopping advancing when the calculated actual rate is not less than the reference rate.

3. An apparatus according to claim 2, wherein said reference knocking occurrence rate for the acceleration state and a reciprocal of said wait period is inversely proportional to the engine speed.

4. An apparatus according to claim 3, wherein said maximum amount for advancing is determined based upon the engine speed and engine load.

* * * * *